(12) United States Patent
Willis

(10) Patent No.: US 6,497,593 B1
(45) Date of Patent: Dec. 24, 2002

(54) WIND-POWERED VEHICLE

(76) Inventor: Peter M. Willis, 1535 Miami Rd., Benton Harbor, MI (US) 49022

(*) Notice: Subject to any disclaimer, the term of this patent is extended or adjusted under 35 U.S.C. 154(b) by 0 days.

(21) Appl. No.: 09/928,277

(22) Filed: Aug. 10, 2001

(51) Int. Cl.[7] .............................................. B63H 13/00
(52) U.S. Cl. ....................................................... 440/8
(58) Field of Search .............................. 440/8; 416/131, 416/132 B, 135

(56) References Cited

U.S. PATENT DOCUMENTS

| | | | |
|---|---|---|---|
| 2,047,155 A | | 7/1936 | Rettman |
| 4,061,105 A | | 12/1977 | Garcia |
| 4,274,011 A | | 6/1981 | Garfinkle |
| 4,276,033 A | | 6/1981 | Krovina |
| 4,324,528 A | * | 4/1982 | Svenning ................ 416/132 B |
| 4,353,702 A | | 10/1982 | Nagy |
| 4,371,346 A | | 2/1983 | Vidal |
| 4,497,631 A | | 2/1985 | Belanger |
| 4,522,600 A | | 6/1985 | Jost |
| 6,261,138 B1 | * | 7/2001 | Imura ........................... 440/8 |

* cited by examiner

Primary Examiner—Ed Swinehart
(74) Attorney, Agent, or Firm—Brooks & Kushman P.C.

(57) ABSTRACT

A wind-powered vehicle having a longitudinal axis and being capable of traveling in the direction thereof across a generally horizontal and generally dense medium such as water, ice or land. The vehicle includes an air propeller assembly rotatable about a propeller axis by generally horizontal wind forces. A rotation of the propeller assembly is communicated by a rotary coupling to a rotary drive member. In one embodiment, the rotary drive member includes a water propeller for propelling a water vehicle. In another embodiment, the rotary drive member includes at least one wheel for propelling a land or ice vehicle. In yet another embodiment, the rotary drive member includes at least one bladed reel for propelling an ice vehicle. The air propeller includes at least two blades extending generally perpendicularly from the propeller axis, each blade being pivotable against a resilient bias and about a laterally adjustable blade pivot axis, which is generally perpendicular to the propeller axis, by generally horizontal wind forces. Manual adjustments are required only to steer the vehicle and to reverse its direction of travel.

13 Claims, 7 Drawing Sheets

WIND-POWERED VEHICLE

BACKGROUND OF THE INVENTION

1. Field of the Invention

This invention relates generally to wind-powered vehicles and more particularly to vehicles having wind-driven propellers rather than traditional sails.

2. Background Art

When two streams are moving at different speeds or in different directions, a velocity differential is said to exist between the streams. Velocity differentials are plentiful in nature. Wind blowing over stationary water creates an air/water velocity differential A river flowing beneath still air or air at a different speed or direction also creates an air/water differential. The wind atop a sail is blowing faster than wind near a boat's deck, an air/air vertical velocity differential exists. If a river is flowing faster at its surface near the middle of the stream as compared to deeper water or water near shore, a water/water differential exists which may be tapped.

Consider a vehicle traveling at some speed and direction that is unrelated to the direction of the two streams. The present invention provides a means of extracting kinetic energy generated by the velocity differential and redirecting it to propel the vehicle. A part of the mechanism is anchored or in direct contact with each of the streams, and the extracted energy minus frictional losses is used to accelerate the vehicle and overcome drag. Excess kinetic energy can alternately be converted to electrical energy, which is storable in auxiliary batteries, fuel cells or other devices for use in motoring the vehicle under calm conditions.

It is possible for such a vehicle of efficient design to travel at high multiples of the velocity differential in any direction relative to the direction of either stream. For example, a sailboat employing a modestly efficient design would be able to sail in any direction including directly into the wind and directly downwind at 3 to 5 times wind speed. The same boat on a river is also be able to run at multiples of river speed upstream, downstream and across the stream. A land vehicle with an air propeller could be used for recreational purposes on a solid surface.

An energy recovery and redirection mechanism is made up of one or more independent pivoting blades (IPB) air propellers and/or one or more IPB water propellers whose rotations are all linked together to a common drive. The mechanism is designed to self-adjust continuously in response to changes in the direction and speed of all the streams relative to the vehicle's speed and direction without manual intervention as is required in traditional sailboats.

Multiple patents describe devices having two propellers, one in contact with a water stream, and the other in contact with an air stream. In all cases, the pitch of at least one of the propellers must be manually adjusted to provide propulsion under varying wind conditions. Prior art taught in U.S. Pat. No. 4,371,346, to Vidal, describes a device requiring a minimum of four controls to operate. The first control is a steering device such as a rudder. The second, is means to position the air propeller so that it has a desired angular disposition relative to the wind. Lastly; means is provided to control independently two of the following three variables: the pitch of the air propeller, the pitch of the water propeller, or the gear ratio of a transmission that connects the two propellers. This design suffers from the following shortcomings:

The angular disposition of the air propeller relative to the wind must be continuously adjusted as the direction of the wind changes. This also requires deck space for the propeller to pivot 360 degrees about a supporting mast.

The propeller pitch and/or transmission ratio must be continually manually adjusted as the speed and direction of the air and wind streams change.

Since the pitches of all the blades change in unison, vertical components of stream energy cannot be used to provide propulsion, but rather impede progress.

Stream velocity gradients cannot be exploited to provide propulsion; forces in these gradients actually oppose one another instead of combining to extract maximum energy.

SUMMARY OF THE INVENTION

In accordance with the present invention, a wind-powered vehicle designed to travel across a generally horizontal relatively dense medium such as water, ice or land is provided. The vehicle includes a body having a longitudinal axis generally aligned with the vehicle's direction of travel and extending within a vertically disposed plane. The vehicle further includes a propeller assembly rotatable about a propeller axis extending within the vertically disposed plane. The propeller assembly has at least two blades extending outward from the propeller axis and pivotally attached to a rotary hub that rotates about the propeller axis. The at least two blades each pivot about a blade pivot axis that is generally perpendicular to the propeller axis. The blades are biased by springs to an initial angular disposition about the blade pivot axis. Wind load caused by a wind moving relative to the vehicle and in a direction generally parallel to a horizontal plane causes each blade to rotate about its respective blade pivot axis until the torque loads on the blades caused by the wind and by the springs are balanced. The blades are thus efficiently positioned relative to the wind to cause the propeller assembly to rotate about the propeller axis.

The vehicle also has a rotary coupling having a first end driven by the rotary hub and a second end providing a rotary output spaced therefrom, and it has a rotary drive member driven and cooperating with the second end of the rotary coupling. The rotary drive member cooperates with a relatively dense medium to drive the vehicle body forward in response to rotation of the propeller assembly by a wind load.

DETAILED DESCRIPTION OF THE PREFERRED EMBODIMENTS

Figure 1:
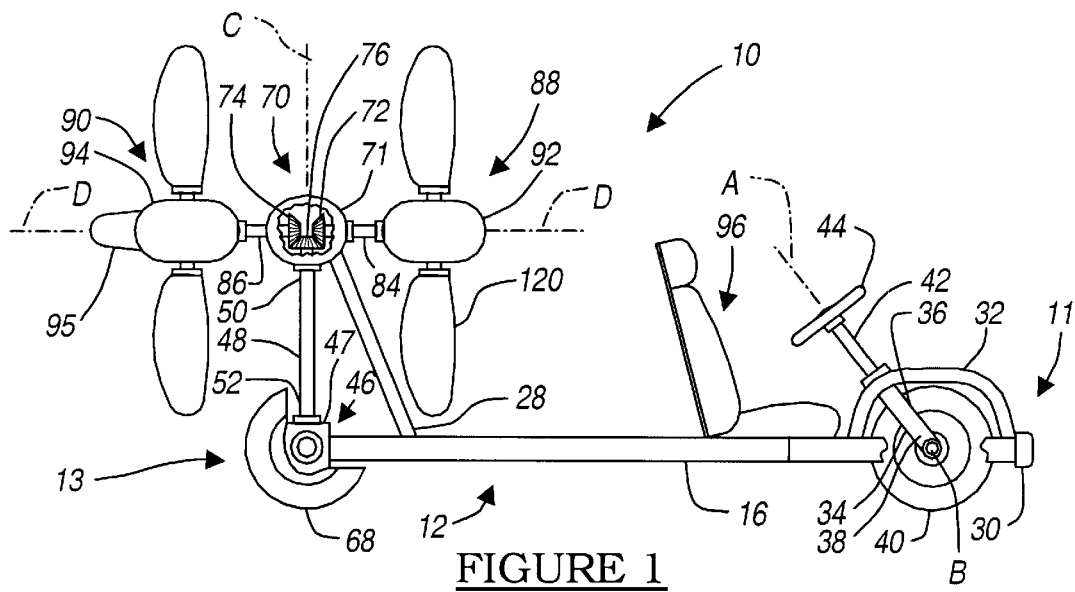
FIG. 1 is a side view, partially broken away, of a basic, prototype structure of a land vehicle including a first embodiment of the present invention.
Figure 2:
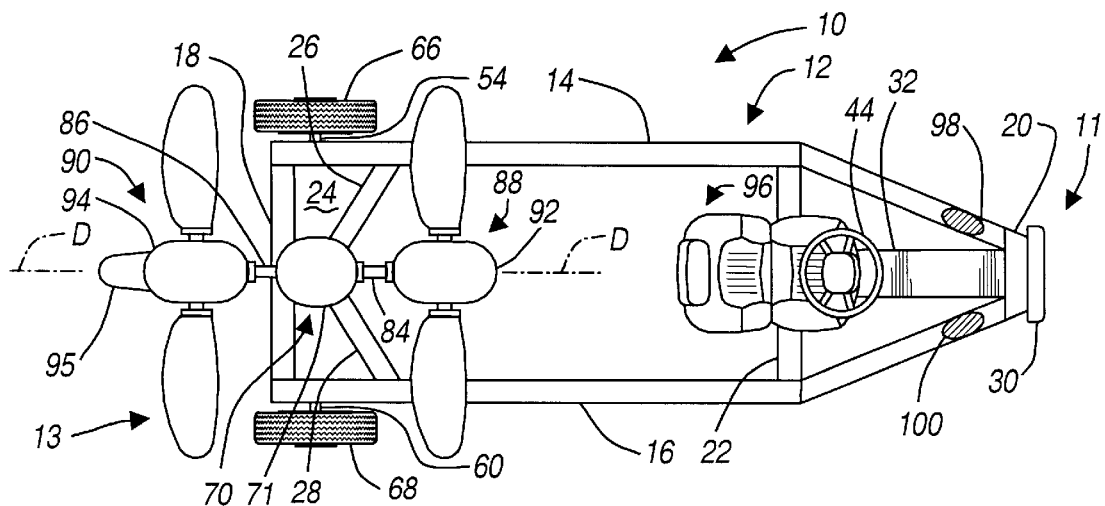
FIG. 2 is a plan view of the vehicle of FIG. 1.

FIGS. 1 and 2 of the drawings illustrate respective side and plan views of a basic, prototype structure of a first embodiment of the present invention. Shown is a wind-powered land vehicle, generally indicated by reference numeral 10. The vehicle 10 has a forward end, generally indicated by reference numeral 11, and a rearward end, generally indicated by reference numeral 13. The vehicle 10 also has a frame, generally indicated by reference numeral 12, having a left longitudinal frame member 14, a right longitudinal frame member 16, a rearward transverse frame member 18, a forward transverse frame member 20, and at least one intermediately disposed transverse frame member 22. A bumper 30 is mounted on the forward transverse frame member 20. Attached to the frame 12 is a generally horizontal floor 24. Attached respectively to the left and right longitudinal frame members 14 and 16 are a left support member 26 and a right support member 28.

A fork mount 32 extends from the intermediately disposed transverse frame member 22 to the forward transverse frame member 20 and arches upwardly therebetween. A fork 34 has a central pivot axis A, an upper end 36 mounted on the fork mount 32 to pivot about the pivot axis A, and a lower end 38. A steerable wheel 40 has a central transverse axis of rotation B and is rotatably secured to the lower end 38 of the fork 34 such that the axis of rotation B of the steerable wheel 40 is at right angles to the pivot axis A of the fork 34 and such that the right angle is maintained as the fork pivots about the axis A. The fork mount 32 serves additionally as a cover for the steerable wheel 40.

A steering column 42 is connected to and extends collinearly upward from the fork 34. A steering wheel 44 is secured to the steering column 42 and cooperates with the latter and the fork 34 to control the direction of the steerable wheel 40. It is to be understood by those skilled in the art that the vehicle could use, rather than one steerable wheel 40 to control the direction of the vehicle, a pair of steerable wheels controlled in a manner well known in the art.

A differential gear set, generally indicated by reference numeral 46 (not shown in detail), is disposed within a differential gear housing 47 at the rearward end 13 of the vehicle 10 and represents any of a number of differential gear sets that are well known in the art and that include a differential input gear, a left differential output gear and a right differential output gear (the gears being obscured in a representative casing). A drive shaft 48, having a central longitudinal axis of rotation C and having a driven end 50 and a driving end 52, is connected at its driving end 52 to the differential input gear for rotation therewith.

A laterally disposed left half-shaft 54 rotates with and extends from the left differential output gear and connects to a left rear wheel 66 for rotation therewith. A laterally disposed right half-shaft 60 rotates with and extends from the right differential output gear and connects to a right rear wheel 66 for rotation therewith. A transfer bevel gear set, generally indicated by reference numeral 70, is disposed within a transfer bevel gear housing 71 above the differential gear set 46. The transfer bevel gear set 70 includes a first input transfer bevel gear 72, a second input transfer bevel gear 74 and an output transfer bevel gear 76. The driven end 50 of the drive shaft 48 is connected to the differential input gear 76 for rotation therewith. Support members 26 and 28 converge as they extend respectively upwardly from the left and right longitudinal frame members 14 and 16 to support the transfer bevel gear housing 71.

A first transfer shaft, generally indicated by reference numeral 84, has a central longitudinal axis of rotation D generally aligned with the vehicle's direction of travel and extends forwardly from the first input transfer bevel gear 72. A second transfer shaft, generally indicated by reference numeral 86, has a central longitudinal axis of rotation aligned with the axis of rotation D of the first transfer shaft 84 and extends rearwardly from the second input transfer bevel gear 74. A first propeller assembly, generally indicated by reference numeral 88, is disposed within a first propeller assembly housing 92 and is connected to and rotates with the first transfer shaft 84. A second propeller assembly, generally indicated by reference numeral 90, is disposed within a second propeller assembly housing 94 and is connected to and rotates with the second transfer shaft 86.

A seat assembly, generally indicated by reference number 96, is secured to the frame 12 of the vehicle 10. The seat assembly 96 is disposed to the rear of the steering wheel 44 and above the intermediately disposed transverse frame member 22. The seat assembly 96 is designed to support a vehicle driver (not shown) and represents any of a number of such configurations that are well-known in the art. A brake pedal assembly 98 is supported by the left longitudinal frame member 14, proximate the forward transverse frame member 20, and is responsive to foot pressure from a vehicle driver to apply any of a number of brakes well known in the art to at least the respective left and right rear wheels 66 and 68. A blade control pedal assembly 100 is supported by the right longitudinal frame member 16, proximate the forward transverse frame member 20, and is responsive to foot pressure from a vehicle driver to reverse and adjust the angle of attack of each of the air propeller blades if a servomotor control is not used.

It is to be understood by those skilled in the art that other types of controls, for example, any of many well-known manually operated controls, could be used in place of the brake and blade pitch control pedal assemblies 98 and 100. Additionally, it is anticipated that a computerized automated system (not shown) could be used, in addition to or instead of the blade pitch control pedal assembly 100, to control adjustable configurations of the propeller blades and thereby maximize operational efficiency under a variety of operating conditions. It is also anticipated that the vehicle 10 be provided with a disengagement device such as any of a number of clutch-like devices (not shown) well-known to those skilled in the art to prevent drive from reaching the rear wheels and/or be provided with any of a number of parking brakes (not shown) well-known to those skilled in the art.

Figure 3:
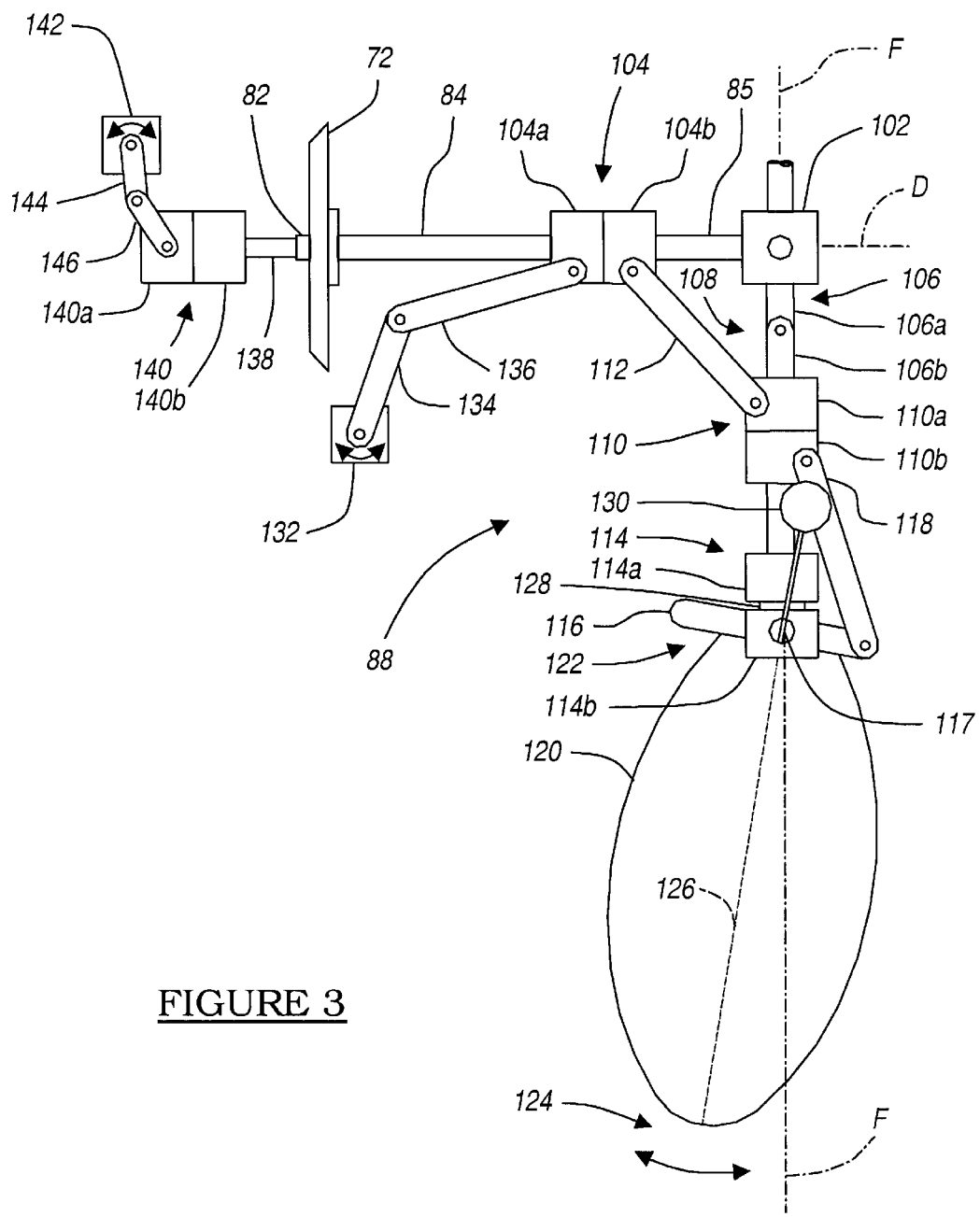
FIG. 3 is a side view of a first propeller assembly.

With reference to FIG. 3, shown is the first propeller assembly 88, which is housed partially within the first propeller assembly housing 92 (FIGS. 1 and 2). It should be understood that the components are shown to represent their relative positions and functions and are not necessarily drawn to scale. The first transfer shaft 84 has a driving end 82 and a driven end 85. A first rotary hub 102 is affixed to the driven end 85 for rotation therewith; and a first transfer shaft split-bearing collar, generally indicated by reference numeral 104, is slidably disposed on the first transfer shaft 84 proximate the first rotary hub 102. The first transfer shaft split-bearing collar 104 has a first portion 104a and a second portion 104b that are rotatably joined to each other and that are capable of independent rotation about the transfer shaft 84. First and second blade mount pivot shafts 106 and 148 respectively are rotatably secured to the first rotary hub 102. The first blade mount pivot shaft 106 extends, as shown, downwardly therefrom at right angles relative to the first transfer shaft 84. The first blade mount pivot shaft 106 has a first portion 106a and a second portion 106b, which are joined by a pin and slot shaft coupling, generally indicated by reference numeral 108.

A first pivot shaft first split-bearing collar, generally indicated by reference numeral 110, is slidably disposed on the second portion 106b of the first blade mount pivot shaft 106 between the pin and slot shaft coupling 108 and the first elongate blade mount 116. The first pivot shaft first split-bearing collar 110 has a first portion 110a and a second portion 110b that are rotatably joined to each other and that are capable of independent rotation about the first blade mount pivot shaft 106. At one of its ends, a first elongate link 112 is pivotally connected to the second portion 104b of the first transfer shaft split-bearing collar 104, the other end thereof being pivotally connected to the first portion 110a of the first pivot shaft split-bearing collar 110. A first pivot shaft second split-bearing collar, generally indicated by reference numeral 114, is also disposed on the second portion 106b of the first blade mount pivot shaft 106 at an end distal from the pin and slot shaft coupling 108. The first pivot shaft second split-bearing collar 114 has a first portion 114a and a second portion 114b that are rotatably joined to each other, the first portion 114a is fixed to the first blade mount pivot shaft 106, and the second portion 114b is pivotable about the first blade mount pivot shaft 106.

A first elongate blade mount 116 is pivotally connected, at a generally centrally located pivot point 117 thereof, to the second portion 114b of the first pivot shaft second split-bearing collar 114. At one of its ends, a second elongate link 118 is pivotally connected to the first portion 110b of the first pivot shaft first split-bearing collar. The other end of the second elongate link 118 is connected to an end of the first elongate blade mount 116. A first propeller blade 120 has a mounting end, generally indicated by reference numeral 122, a tip, generally indicated by reference numeral 124, and a static axis 126 extending longitudinally and centrally through the first propeller blade 120. The mounting end 122 is affixed to the first elongate blade mount 116 so that the first propeller blade 120 pivots about the centrally located pivot point 117 with the first elongate blade mount 116.

A first servomotor 132 has an actuator arm 134 pivotally connected by way of a third elongate link 136 to the first portion 104a of the first transfer shaft split-bearing collar 104. Electric energy to actuate one or more servomotors is typically provided by a storage battery (not shown) charged by the electric generator 95. When actuated in a clockwise direction, the servomotor 132 drives the actuator arm 134 and the third elongate link 136 to force the first transfer shaft split-bearing collar 104 along the first transfer shaft 84 toward the first pivotal rotary hub 102. This forces, via the first elongate link 112, the first pivot shaft first split-bearing collar 110 along the second portion 106b of the first blade mount pivot shaft 106 toward the first elongate blade mount 116. In turn, this forces, via the second elongate link 118, the first elongate blade mount 116 to pivot in a clockwise direction about its pivot point 117, which pivots the first propeller blade 120 in the same direction about the same pivot point. When actuated in a counterclockwise direction, the servomotor 132 drives the components just described in a reverse direction. When the first propeller blade 120 pivots sufficiently about the pivot point 117 for the static axis 126 to pivot past the pivot axis F of the first blade mount pivot shaft 106, the first propeller blade 120 pivots about the latter axis F so that wind forces the plane of the first propeller blade 120 to reverse its angular displacement relative to the direction of the rotation axis D of the first propeller assembly 88; and the first propeller assembly 88 reverses its direction of rotation about its axis of rotation D. A counterweight 130 is disposed opposite the pivot point 117 from the first propeller blade 120 to revolve about the pivot point 117 and thereby balance pivoting motions of the first propeller blade 120.

Figure 4:
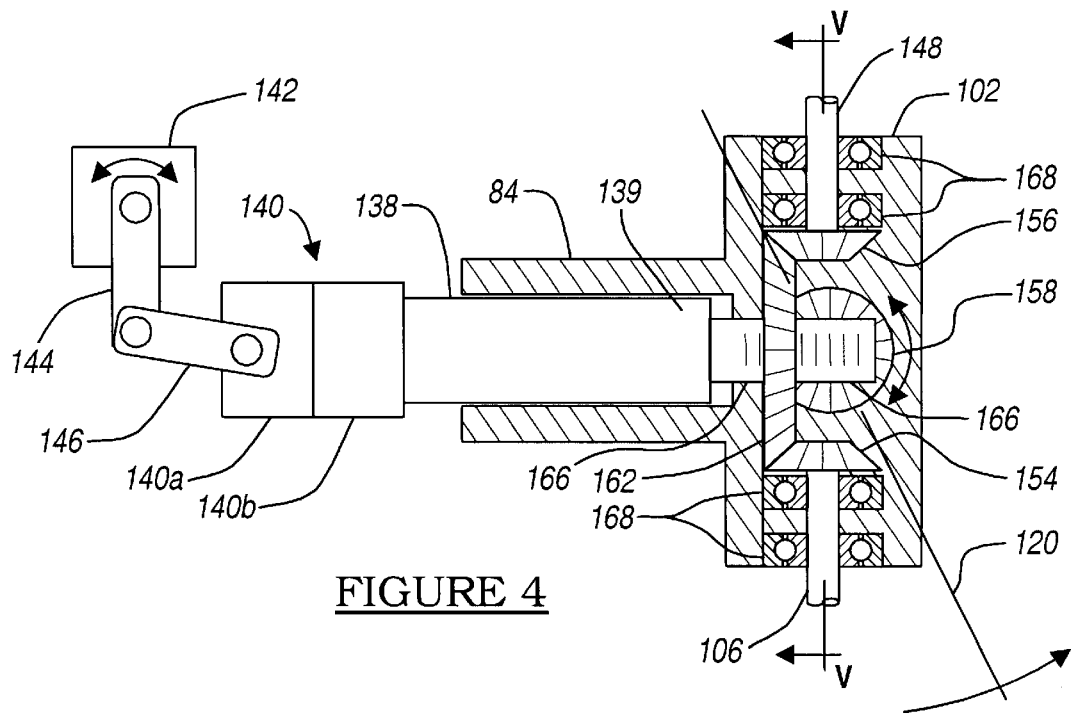
FIG. 4 is a side view, partially in section, showing details of a portion of the propeller assembly of FIG. 3.

The first transfer shaft 84 is hollow and closely admits a fifth blade mount pivot shaft 138 that is longitudinally slidable therewithin, the first transfer shaft 84 being freely rotatable about the fifth blade mount pivot shaft 138. The fifth blade mount pivot shaft 138 has a rotary hub end 139 (FIG. 4). A fifth pivot shaft split-bearing collar, generally indicated by reference numeral 140, is disposed on the fifth blade mount pivot shaft 138 proximate the first input bevel gear 72. The fifth pivot shaft split-bearing collar 140 includes a first portion 140a, within which the fifth blade mount pivot shaft 138 rotates, and a second portion 140b, which is affixed to the fifth blade mount pivot shaft 138 to rotate therewith.

A second servomotor 142 has an actuator arm 144 pivotally connected by way of a fourth elongate link 146 to the first portion 140a of the fifth pivot shaft split-bearing collar 140. When actuated in a counterclockwise direction, the second servomotor 142 drives the actuator arm 144 and the fourth elongate link 146 to force the fifth blade mount pivot shaft 138 toward the first rotary hub 102. When actuated in a clockwise direction, the servomotor 142 drives the components just described in a reverse direction, which pulls the fifth blade mount pivot shaft 138 in a direction away from the first rotary hub 102.

Figure 5:
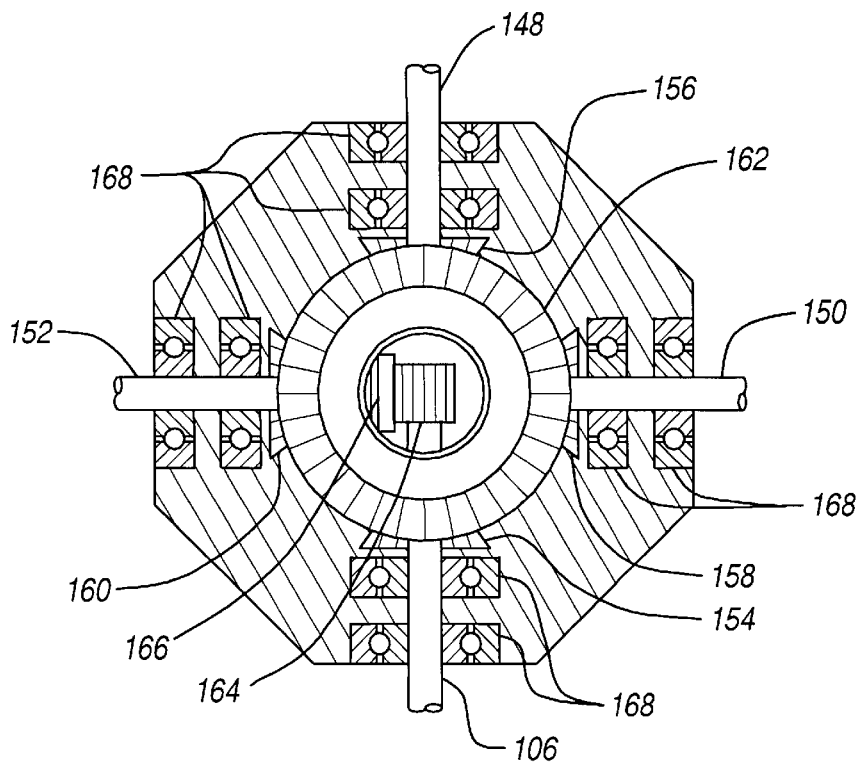
FIG. 5 is an end view, taken along the line V—V of the portion of the propeller assembly of FIG. 4.

FIGS. 4 and 5 show the first rotary hub 102, which has provision for mounting four propeller blades. FIG. 5 is a sectional view taken along the line V—V of FIG. 4. In addition to showing the first blade mount pivot shaft 106 for supporting and pivoting the first propeller 120, the two figures also show portions of second, third and fourth blade mount pivot shafts 148, 150 and 152 respectively for supporting and pivoting three additional propeller blades, shown, for example, by FIGS. 8 and 9. The first, second, third and fourth blade mount pivot shafts 106, 148, 150 and 152 respectively are rotatably supported by the rotary hub 102 with bearings 168. The first, second, third and fourth blade mount pivot shafts 106, 148, 150 and 152 extend longitudinally at right angles to each other and in the same plane. First, second, third and fourth hub bevel gears 154, 156, 158 and 160 are respectively affixed to the first, second, third and fourth shafts 106, 148, 150 and 152 for rotation therewith. A fifth hub bevel gear 162 rotates about the axis of rotation D and meshes with each of the first, second, third and fourth hub bevel gears 154, 156, 158 and 160 respectively. When any one of the first, second, third and fourth hub bevel gears 154, 156, 158 and 160 is rotated, it rotates the fifth hub bevel gear 162, which in turn rotates each of the other three hub bevel gears.

Extending from the hub end 139 of the fifth blade mount pivot shaft 138 is a rack 166. As shown, a pinion gear 164 is affixed to the first blade mount pivot shaft 106, which extends within the first rotary hub 102 to a point where the pinion gear 164 engages the rack 166. When the pitch of the blades is to be adjusted, the second servomotor 142 is actuated in a counterclockwise or clockwise direction. As previously described, this forces the fifth blade mount pivot shaft 138 respectively toward or away from the first rotary hub 102. The rack moves with the fifth blade mount pivot shaft 138, causing the pinion 164 to rotate, which also rotates the first blade mount pivot shaft 106. As described, when any one of the first, second, third and fourth hub bevel gears 154, 156, 158 and 160 is rotated, it rotates the fifth hub bevel gear 162, which in turn rotates each of the other three hub bevel gears. This rotates each of the first, second, third and fourth blade mount pivot shafts 106, 148, 150 and 152 respectively, which pivots the propeller blades, thereby adjusting the pitch by the same amount on each of the propeller blades, such as the first propeller blade 120 shown in FIG. 3. It is to be noted that steering the vehicle and reversing its direction of travel are the only two manual adjustments required when operating the present invention. The propeller assemblies, for example, 88, are fixedly oriented facing the forward end of the vehicle and need not be turned to face in any particular direction with respect to that of the wind to obtain efficient operation.

Figure 12:
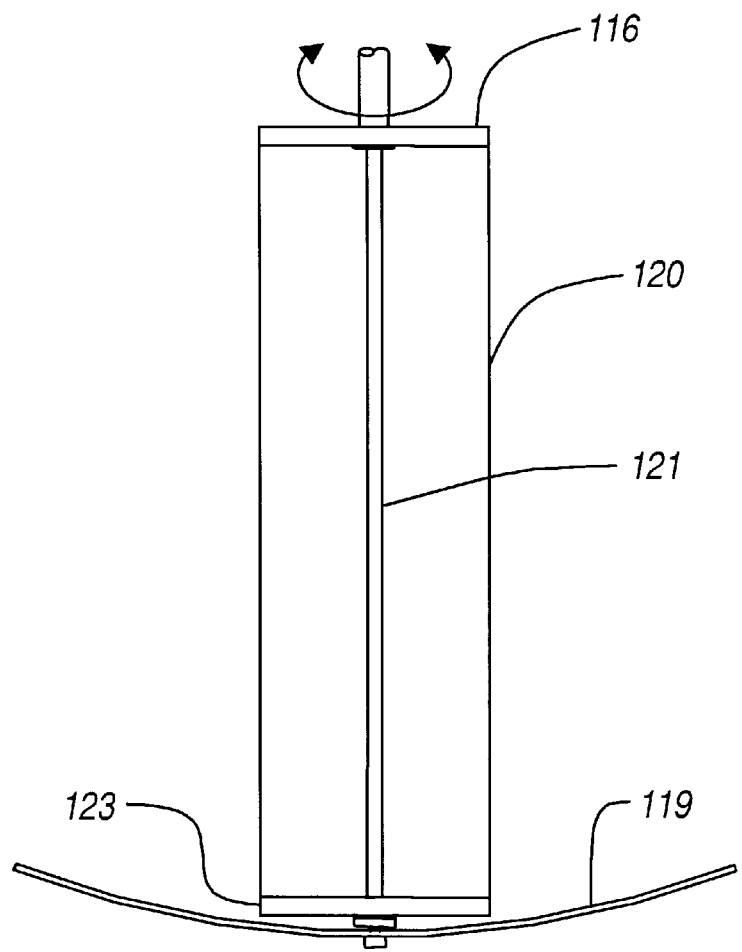
FIG. 12 is a side view of a representation of a portion of the propeller assembly and including a seventh embodiment of the present invention.
Figure 13:
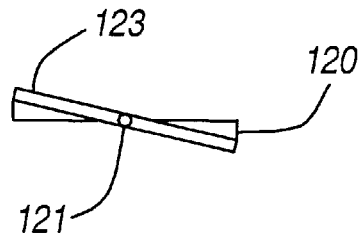
FIG. 13 is an end view of the portion of the propeller assembly of FIG. 12.

If desired, blade pitch can be varied along the length of the blade 120. FIGS. 12 and 13 show a representation of the propeller blade 120 (FIG. 3) supported at its mounting end by the first elongate blade mount 116. Affixed to the blade tip 124 is a first elongate blade tip mount 123. Extending to the tip 124 is a first pitch adjusting shaft 121, the rotation of which by, for example, a servomotor and associated mechanism, not shown but similar to that used to rotate the first blade mount pivot shaft 106, rotates the first elongate blade tip mount 123, twisting the first blade to vary its pitch along its static axis 126. If desired, a hoop 119 can be disposed circumferentially, thus rotatably supporting the tip of each pitch adjusting shaft and maintaining equal angular displacements between each propeller blade.

With reference again to FIG. 3, a pivot control apparatus, or torsion spring, generally indicated by reference numeral 128, is disposed between the first portion 114a and the second portion 114b of the first pivot shaft second split-bearing collar 114. The torsion spring 128 resiliently establishes an initial angle, or pitch, between the plane of the propeller blade 120 and the plane defined by the first transfer shaft 84 and the first blade mount pivot shaft 106 when no wind forces are acting on the first propeller blade 120. Similar torsion springs perform the same function, in the same manner, on other propeller blades, shown, for example, in FIGS. 8 and 9.

The most effective initial propeller blade pitch setting during most common wind conditions is 45 degrees; however, initial settings for other wind conditions may generally range from 20 to 70 degrees. Being resilient, the torsion spring 128 allows the first propeller 120 to be pivoted by wind forces to a pitch that need not be the same as others as wind forces acting on the other propeller blades vary. It is to be understood by those skilled in the art that the torsion spring 128, and all others, could be replaced by servomotors (not shown) that would actively rather than passively adjust the pitch of each propeller blade individually under control of a computer according to sensed wind forces.

In FIGS. 1 and 2, the second propeller assembly, generally indicated by reference numeral 90, is the same as the first propeller assembly 88 except that it rotates in the opposite direction. Also, the second propeller assembly 90 has connected to it an electric generator 95.

Figure 6:
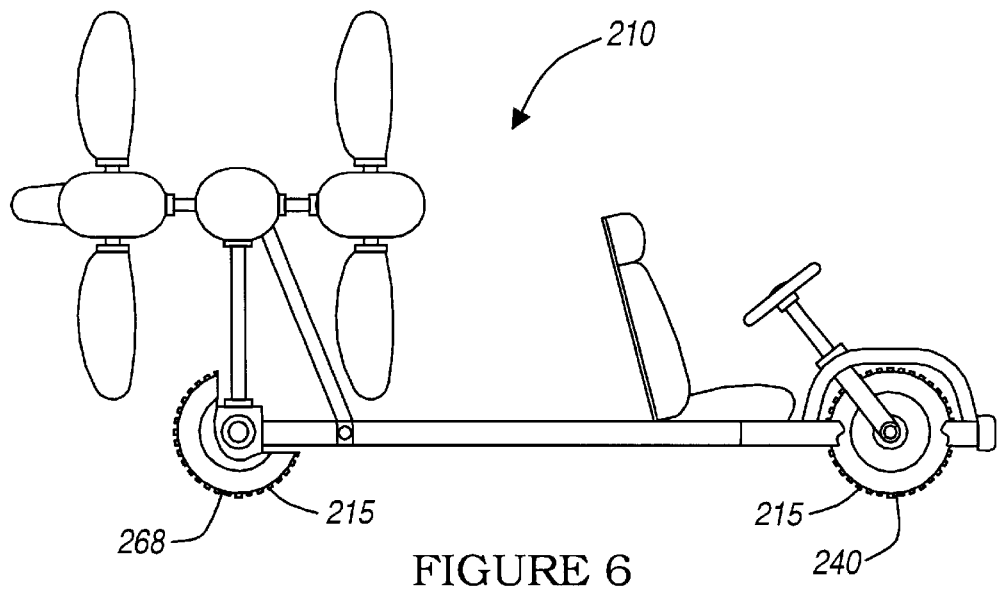
FIG. 6 is a view, similar to the view of FIG. 1, of a second embodiment of the present invention, designed for use on ice.

FIG. 6 illustrates a side view of a basic, prototype structure of a second embodiment of the present invention. Shown is a wind-powered ice vehicle, generally indicated by reference numeral 210. The second embodiment is the same as the first embodiment of the invention except that wheels 240, 266 (not visible) and 268 are provided with radially extending studs 215 to provide additional traction when the vehicle 210 is operated on an ice surface. The same components as shown by FIGS. 1 and 2 share the same reference numerals (plus 200) with those shown by FIG. 6. Many of these numerals have been omitted from FIG. 6, however, to facilitate the recognition of components of the second embodiment of the invention that differ from those of the first embodiment.

Figure 7:
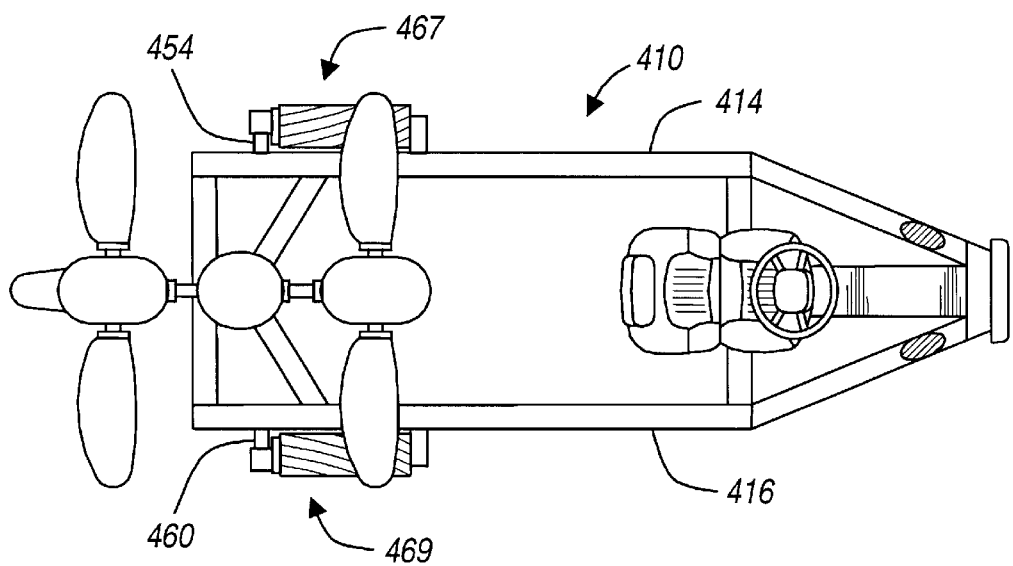
FIG. 7 is a view, similar to the view of FIG. 6, of a third embodiment of the present invention, designed for use on ice.

Similarly, FIG. 7 illustrates a plan view of a basic, prototype structure of a third embodiment of the present invention. Shown is a wind-powered ice vehicle, generally indicated by reference numeral 410. The third embodiment is the same as the second embodiment of the invention except that the rear wheels 266 and 268 and studs 215 have been replaced with left and right bladed reels, generally indicated by reference numerals 467 and 469 respectively. The latter bear resemblance to a cutting assembly of a reel-type lawn mower and typically have some five blades spiraling slightly from one end of a reel to the other. The left and right bladed reels 467 and 469 are respectively mounted on the left and right longitudinal frame members 414 and 416 and are respectively rotated by left and right half-shafts 454 and 460 via common gear apparatuses. The left and right bladed reels 467 and 469 turn in opposite directions, and their respective blades are spirally disposed in opposite directions to provide balanced traction when the vehicle 410 is traveling on an ice surface. The same components as shown by FIGS. 1 and 2 share the same reference numerals (plus 400) with those shown by FIG. 7. Many of these numerals have been omitted from FIG. 7 to facilitate the recognition of components of the third embodiment of the invention that differ from those of the first embodiment.

Figure 8:
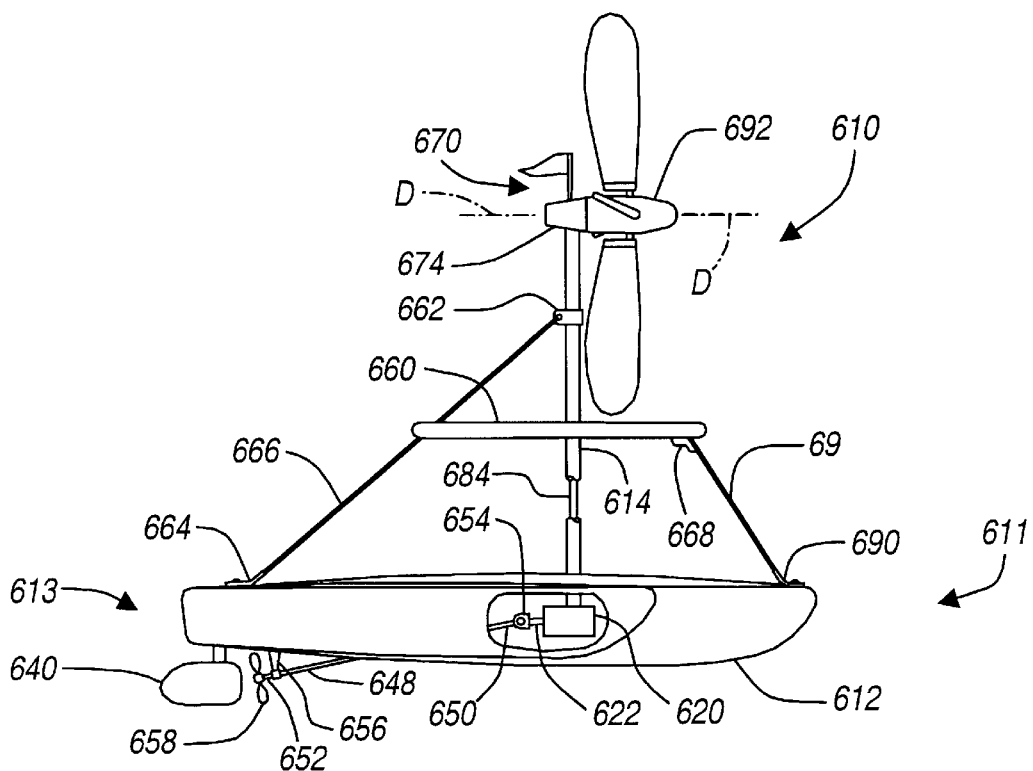
FIG. 8 is a side view, partially broken away, of a basic, prototype structure of a water vehicle including a fourth embodiment of the present invention.
Figure 9:
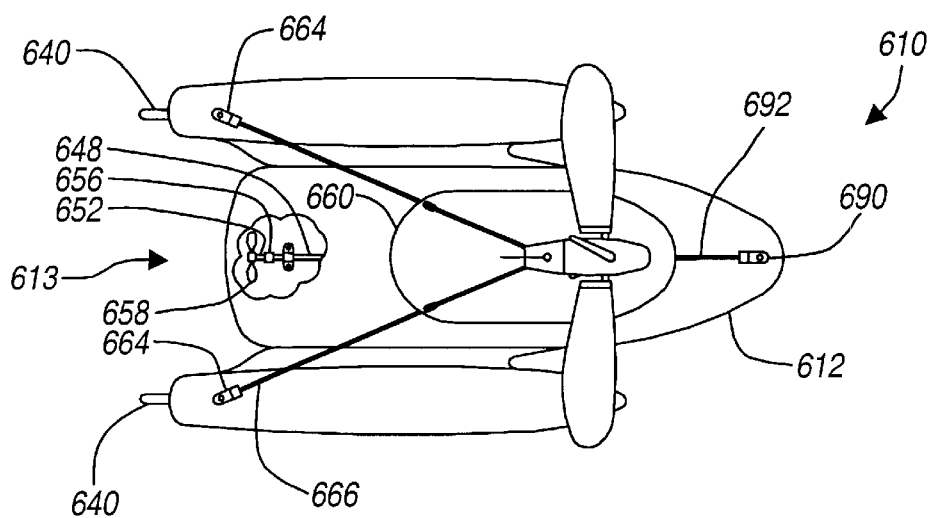
FIG. 9 is a plan view, partially broken away, of the vehicle of FIG. 8.

FIGS. 8 and 9 illustrate respective side and plan views of a basic, prototype structure of a fourth embodiment of the present invention. Shown is a wind-powered water vehicle, generally indicated by reference numeral 610. The vehicle 610 has a forward end, or bow, generally indicated by reference numeral 611, and a rearward end, or stern, generally indicated by reference numeral 613. The vehicle 610 also has a body 612. The body shown has a configuration of a trimaran, but it is to be understood by those skilled in the art that bodies having different configurations but similar operational characteristics could be used.

The wind-powered water vehicle 610 has a propeller assembly similar to the first propeller assembly 88 previously described in detail and shown by FIGS. 3 through 5. It is housed within a propeller assembly housing 692 and has an electric generator (also housed within the propeller assembly housing 692) attached thereto. The propeller assembly output is connected via any of many well-known right-angle gear set to a vertical drive shaft 684, which communicates torque between the right-angle gear set and a transmission 620. The vertical drive shaft 684 is housed within a mast 614, which supports the propeller assembly housing 692.

A transmission 620 is mounted within the body 612 and has a rotary input member 621 that connects to and rotates with the lower end 618 of the vertical drive shaft 684. The transmission 620 has a rotary output member 622, which is connected to a universal joint 654. A generally horizontal drive shaft 648 has a forward end 650 and a rearward end 652. The forward end 650 is connected to and rotates with the universal joint 654, which provides support for the forward end 650. The generally horizontal drive shaft 648 extends rearwardly, and downwardly at a relatively small angle relative to the central longitudinal axis of rotation D, through a water-tight, through-hull fitting (not shown) mounted in the body 612. A strut 656 depends from the body 612 and supports the rearward end 652 of the generally horizontal drive shaft 648 as the latter passes therethrough. A water propeller 658 is affixed to the rearward end 652 of the generally horizontal drive shaft 648 for rotation therewith.

A horizontal and longitudinally extending platform 660 is supported by the mast 614 proximate the midpoint of the latter. To minimize wind effect on the platform 660, it is preferably formed of material having perforations to permit airflow therethrough. A backstay mast tang 662 is mounted on the mast 614 proximate the midpoint between the upper end 616 of the latter and the platform 660, and a pair of backstay deck tangs 664 are secured to left and right portions of the body 612 proximate the stern 613 thereof. A pair of backstays 666 extend from the backstay mast tang 662, through rearward portions of the platform 660, and to the respective backstay deck tangs 664. The backstays 666 stabilize the mast 614 from rear and sideways positions. A forestay platform tang 668 is mounted on the platform 660 proximate a forward edge thereof, and a forestay deck tang 690 is secured to the body 612 proximate the bow 611 thereof. A forestay 692 extends from the forestay platform tang 668 to the forestay deck tang 690. The forestay 692 stabilizes the mast 614 from a forward position.

A pair of rudders 640 pivotally depend from left and right portions of the body 612 proximate the stern 613 thereof. The rudders 640 are pivoted to steer the wind-powered water vehicle 610 by any of a number of devices, such as a tiller or a steering wheel assembly (both not shown), well known to those skilled in the art.

The wind-powered water vehicle 610 is used as an example in the following to describe in more detail the operation of the invention. When there is an absence of local wind, both the water propeller 658 and the air propellers return to their relaxed positions and cut cleanly through their respective medium with a predefined pitch with minimal drag. If a wind force is applied, the blades immediately compensate by changing their relative pitches, allowing the wind force to initiate forward propulsion. Gusts and changing winds, as well as changes in vehicle course, are automatically handled without requiring the intervention of a sailor to adjust the pitch or direction of the propellers or the direction of the boat.

Each propeller has a minimum of two blades. By employing three or more blades per propeller, both vertical and horizontal components of the streams' velocities are simultaneously used for propulsion. Four or more blades are employed for smooth, balanced operation of the propellers. In addition, since each blade operates relatively independently, velocity gradients may be exploited for energy made available thereby. In this way, higher wind velocities present, for example, at higher portions of a propeller blade, cooperate with slower laminar wind velocities at lower portions near the deck to provide forces that accelerate or maintain the speed of a boat rather than forces that decelerate it.

To simplify the following description of the operation of the present invention, a two-propeller device is assumed to have one propeller in the air and the other in the water. Each propeller is assumed to have four blades. The principle can be easily extended to multiple propellers. A working surface area (WSA) of a propeller in a stream is defined as that portion of the propeller's total surface area that is perpendicular to the direction of a first moving stream . The working force (Working Force,) on the propeller in the air is expressed as follows:

$$\text{Working Force}_1 = \text{Velocity}^2 \times \text{Density}_1 \times WSA_1$$

where:

Velocity: is the vector difference between the velocity of two streams, and $\text{Density}_1$ is the density in mass per unit volume.

Likewise, the working force (Working Force$_2$) on the propeller in the water is defined as follows:

$$\text{Working Force}_2 = \text{Velocity}^2 \times \text{Density}_2 \times WSA_2.$$

The two propellers are connected together through a drive mechanism and therefore, neglecting frictional losses, the two working forces are equal. Because water is approximately 800 times more dense than air, the working surface area of the air propeller must be 800 times greater than that of a water propeller to balance the forces. This force is used to counteract the force of drag and accelerate the boat.

Because the propeller's blades are allowed to pivot independently, the working surface area thereof is automatically adjusted. For all example cases described hereafter, the air and wind propellers are considered to have equal nominal counterclockwise screw pitches.

During downwind travel, when the air propeller is experiencing wind coming from the rear, the wind causes the blades to change to a higher pitch (wherewith a revolution of the propeller traces a shorter path through the air). The change of pitch has two effects: the first is to decrease the rotational force of the propeller; and the second is to increase the net forward push of the propeller, much like a stationary sail. Because the air propeller is at a higher pitch, the rotational force of the air propeller is not sufficient to overcome the rotational resistance force of the water propeller. The boat moves forward, and the water propeller is dragged forward. The rotation of the propeller is actually opposite that predicted by a free-running air propeller. This is sometimes counterintuitive and often requires a demonstration for confirmation. As the boat gains speed, its terminal velocity is reached when the force generated by the differential air/water velocity is equal to the combined air and water drag of the boat. This terminal velocity may be many times greater than the wind speed.

During windward travel, when the air propeller is experiencing wind coming from the front, the wind causes the blades to change to a lower pitch (wherewith a revolution of the propeller traces a longer path through the air). The change of pitch has two effects: the first is to increase the rotational force of the propeller; and the second is to decrease the net rearward push of the propeller, much like a stationary sail. Because the air propeller is at a lower pitch, the rotational force of the wind propeller is sufficient to overcome the rotational resistance force of the water propeller. The water propeller begins to spin in the water. The spinning increases the thrust capability of the water propeller; and the boat moves forward. The rotation of the propeller is actually that predicted by a free-running air propeller. This again is sometimes counterintuitive and often requires a demonstration for confirmation. As the boat gains speed, its terminal velocity is reached when the force generated by the differential air/water velocity is equal to the combined air and water drag of the boat. Again, this terminal velocity may be many times greater than the wind speed.

During crosswind travel, when the air propeller is experiencing wind coming from, for example, the starboard side, the wind causes the blade at the top of the propeller to change to a lower pitch, and the blade at the bottom to change to a higher pitch. This causes the propeller to rotate in the counterclockwise direction. The pitch of the two horizontal blades increases slightly, providing some propulsion. In addition, the water propeller begins to spin, causing the blades to change to a higher pitch; and the boat is propelled forward. As the air propeller rotates, a succeeding blade moves to the top. As the boat gains speed, its terminal velocity is reached when the force generated by the differential air/water velocity is equal to the combined air and water drag of the boat. Again, this terminal velocity may be many times greater than the wind speed.

Figure 10:
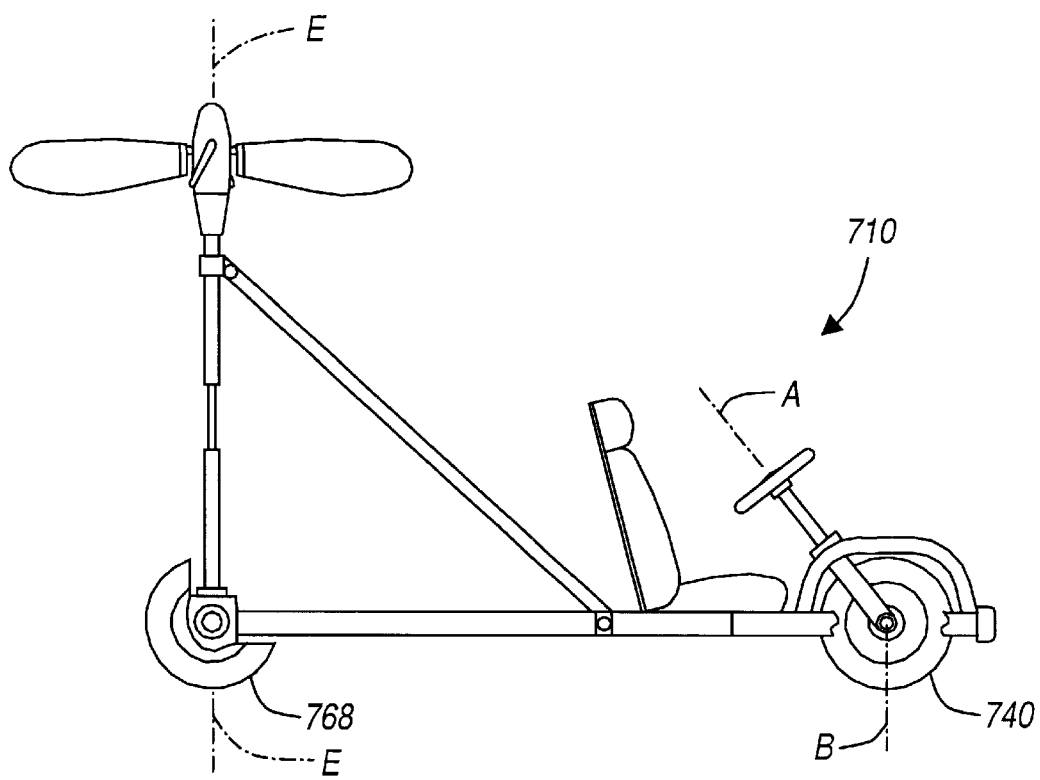
FIG. 10 is a side view, partially broken away, of a land vehicle similar to that of FIG. 1 and including a fifth embodiment of the invention.

FIG. 10 of the drawings illustrates a side view of a basic, prototype structure of a fifth embodiment of the present invention. Shown is a wind-powered land vehicle, generally indicated by reference numeral 710. The fifth embodiment 710 is the same as the first embodiment 10 (FIGS. 1 and 2) of the invention except that it has been modified to include only one propeller assembly and so that the axis of rotation E of the propeller assembly is generally vertical. The components shown by FIG. 10 share the same reference numerals (plus 700) with the same components shown by FIGS. 1 and 2. Many of these numerals have been omitted from FIG. 10, however, to facilitate the recognition of components of the fifth embodiment of the invention that differ from those of the first embodiment.

Figure 11:
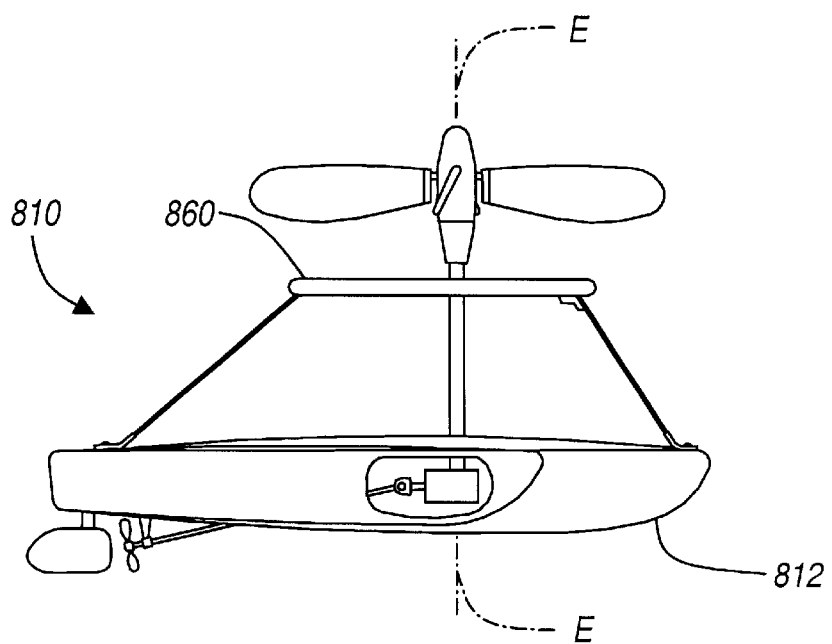
FIG. 11 is a side view, partially broken away, of a water vehicle similar to that of FIG. 8 and including a sixth embodiment of the invention.

Similarly, FIG. 11 illustrates a side view of a basic, prototype structure of a sixth embodiment of the present invention. Shown is a wind-powered water vehicle, generally indicated by reference numeral 810. The sixth embodiment 810 is the same as the fourth embodiment (FIGS. 8 and 9) of the invention except that it has been modified to include only one propeller assembly and so that the axis of rotation E of the propeller assembly is generally vertical. The components shown by FIG. 11 share the same reference numerals (plus 200) with the same components shown by FIGS. 8 and 9. Many of these numerals have been omitted from FIG. 11, however, to facilitate the recognition of components of the sixth embodiment of the invention that differ from those of the fourth embodiment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A wind-powered vehicle designed to travel across a generally horizontal, relatively dense medium such as water, ice or land, the vehicle including a body having a longitudinal axis generally aligned with the vehicle's direction of travel and extending within a vertically disposed plane, the vehicle comprising:
    at least one propeller assembly rotatable about a propeller axis extending within the vertically disposed plane, the at least one propeller assembly having at least two propeller blades extending oppositely and outwardly from the propeller axis and being pivotally attached to a rotary hub that rotates about the propeller axis, the at least two propeller blades each being pivotable about a blade pivot axis;
    at least two pivot control apparatuses each of which sets one of the at least two propeller blades to an initial angular disposition about its blade pivot axis and provides a restoring torque that is a function of the angular displacement, and therefore of wind force, of the propeller blade from its initial angular disposition to position the propeller blade for efficient rotation of the at least one propeller assembly about the propeller axis;
    a rotary coupling having a first end driven by the rotary hub and a second end providing a rotary output spaced therefrom; and
    at least one rotary drive member driven and cooperating with the second end of the rotary coupling, the rotary drive member cooperating with a relatively dense medium to drive the vehicle body forward in response to rotation of the propeller assembly by a wind force.

2. The wind-powered vehicle of claim 1, further comprising an electric generator driven by the at least one propeller assembly.

3. The wind-powered vehicle of claim 1, wherein each of the at least two pivot control apparatuses comprises a torsion spring connected between a first portion and a second portion of a first pivot shaft second split-bearing collar to allow a change of pitch of each of the at least two propeller blades under the influence of changing wind forces.

4. The wind-powered vehicle of claim 3, wherein the at least one propeller assembly further comprises:
    a hollow first transfer shaft having a driving end and a driven end, the driven end being affixed to the rotary hub and the driving end extending therefrom along the propeller axis, a wind force acting upon the propeller blades causing the rotary hub to rotate, thereby rotating the hollow first transfer shaft;
    at least first and second blade mount pivot shafts rotatably secured to and extending oppositely from the rotary hub at right angles to the first transfer shaft;
    a first pivot shaft second split-bearing collar having a first portion and a second portion that are rotatably joined to each other, the first portion being affixed to the first blade mount pivot shaft and the second portion being rotatable about the first blade mount pivot shaft at the end thereof opposite that rotatably secured to the rotary hub;
    a first elongate blade mount pivotally secured at a generally central pivot point to the second portion of the first pivot shaft second split-bearing collar, one of the at least two propeller blades being affixed to the first elongate blade mount;
    a fifth blade mount pivot shaft closely admitted within and slidably extending longitudinally through the hollow first transfer shaft to a position partially within the rotary hub;
    a rack extending longitudinally within the rotary hub from the fifth blade mount pivot shaft;
    a torsion spring connected between the first portion and the second portion of the first pivot shaft second split-bearing collar to allow a change of pitch of the first propeller blade under the influence of changing wind forces; and
    a pinion affixed to an end of the first blade mount pivot shaft that extends sufficiently into the rotary hub to engage the rack, a longitudinal movement of the fifth blade mount pivot shaft linearly moving the rack, thereby rotating the pinion and the first blade mount pivot shaft and pivoting therewith the first propeller blade about the pivot axis of the blade mount pivot shaft.

5. The wind-powered vehicle of claim 4, wherein the at least one propeller assembly further comprises:
- a first transfer shaft split-bearing collar slidably disposed on the first transfer shaft proximate the first rotary hub and having a first portion and a second portion that are rotatably joined to each other and that are independently rotatable about the first transfer shaft;
- a first pivot shaft first split-bearing collar slidably disposed on the blade mount pivot shaft and having a first portion and a second portion that are rotatably joined to each other and that are independently rotatable about the first blade mount pivot shaft;
- a first elongate link pivotally secured at one end thereof to the second portion of the first transfer shaft split-bearing collar and at the other end thereof to the first portion of the first pivot shaft first split-bearing collar;
- a second elongate link pivotally connected at one end thereof to the second end of the first pivot shaft first split-bearing collar and at the other end thereof to an end of the first elongate blade mount, a longitudinal movement of the first transfer shaft split-bearing collar linearly moving the first pivot shaft first split-bearing collar, thereby pivoting about the pivot point thereof the first elongate blade mount and the first propeller blade attached thereto.

6. The wind-powered vehicle of claim 5, wherein the at least one propeller assembly further comprises a counterweight connected to the first propeller blade and disposed opposite the pivot point of the first elongate blade mount therefrom, thereby balancing pivoting motions of the first propeller blade about the pivot point.

7. The wind-powered vehicle of claim 6, further comprising:
- at least one first servomotor fixedly supported relative to the body of the vehicle;
- a first actuator arm attached at one end thereof to the at least one first servomotor to pivot thereabout when the at least one first servomotor is actuated;
- a third elongate link pivotally attached between the other end of the first actuator arm and the first portion of the first transfer shaft split-bearing collar, thereby linearly moving the first transfer shaft split-bearing collar and pivoting about the pivot point thereof the first elongate blade mount and the first propeller blade attached thereto.

8. The wind-powered vehicle of claim 7, further comprising:
- at least one second servomotor fixedly supported relative to the body of the vehicle;
- a second actuator arm attached at one end thereof to the at least one second servomotor to pivot thereabout when the at least one second servomotor is actuated;
- a fourth elongate link pivotally attached between the other end of the second actuator arm and the first portion of the fifth transfer shaft split-bearing collar, thereby linearly moving the fifth blade mount pivot shaft and the rack, thereby rotating the pinion and the first blade mount pivot shaft and pivoting therewith the first propeller blade about the pivot axis of the blade mount pivot shaft.

9. The wind-powered vehicle of claim 8, wherein the rotary coupling comprises:
- a transfer bevel gear set including:
  - at least a first input transfer bevel gear connected to the first transfer shaft for rotation therewith about the rotation axis of the first transfer shaft; and
  - an output transfer bevel gear meshing with the at least first input transfer bevel gear to rotate about a generally vertical output transfer bevel gear axis;
- the rotary coupling further comprising a differential gear set including:
  - a differential input gear;
  - a left differential output gear meshing with the differential input gear to rotate therewith about an axis at right angles thereto; and
  - a right differential output gear meshing with the differential input gear to rotate therewith about an axis at right angles thereto and aligned with the axis of rotation of the left differential output gear;
- the rotary coupling further comprising a drive shaft connecting the output transfer bevel gear to the differential input gear;
- the rotary coupling further comprising:
  - a laterally disposed left half-shaft; and
  - a laterally disposed right half-shaft, the each of the left and right half-shafts being connected to one of the at least one rotary drive members for rotation therewith.

10. The wind-powered vehicle of claim 9, wherein the relatively dense medium comprises land and the rotary drive member comprises at least one wheel.

11. The wind-powered vehicle of claim 9, wherein the relatively dense medium comprises ice and the at least one wheel is peripherally studded.

12. The wind-powered vehicle of claim 9, wherein the relatively dense medium comprises water and the rotary drive member comprises a water propeller.

13. The wind-powered vehicle of claim 8, wherein the body is in the form of a boat and the rotary coupling comprises:
- a transfer bevel gear set including:
  - at least a first input transfer bevel gear connected to the first transfer shaft for rotation therewith about the rotation axis of the first transfer shaft;
  - an output transfer bevel gear meshing with the at least first input transfer bevel gear to rotate about a generally vertical output transfer bevel gear axis;
- a transmission secured to the body and having a rotary input member and a rotary output member;
- a vertical drive shaft connecting the output transfer bevel gear to the rotary input member of the transmission;
- a water propeller; and
- a generally horizontal drive shaft connecting the rotary output member of the transmission to the water propeller.

* * * * *